(12) United States Patent
Nakagawa

(10) Patent No.: US 7,260,138 B1
(45) Date of Patent: Aug. 21, 2007

(54) BASE STATION TRANSMITTER AND CDMA MOBILE COMMUNICATION SYSTEM COMPRISING THE SAME

(75) Inventor: Takashi Nakagawa, Saitama (JP)

(73) Assignee: NEC Corporation, Tokyo (JP)

( * ) Notice: Subject to any disclaimer, the term of this patent is extended or adjusted under 35 U.S.C. 154(b) by 1066 days.

(21) Appl. No.: 10/048,059

(22) PCT Filed: Jul. 26, 2000

(86) PCT No.: PCT/JP00/04961

§ 371 (c)(1),
(2), (4) Date: Jun. 6, 2002

(87) PCT Pub. No.: WO01/08329

PCT Pub. Date: Feb. 1, 2001

(30) Foreign Application Priority Data

Jul. 28, 1999 (JP) .................................. 11-214204

(51) Int. Cl.
    *H04K 1/00* (2006.01)
(52) U.S. Cl. ........................ 375/146; 375/130; 375/297
(58) Field of Classification Search ................ 375/146, 375/130; 455/249.1
    See application file for complete search history.

(56) References Cited

U.S. PATENT DOCUMENTS

| | | | |
|---|---|---|---|
| 5,606,285 A | | 2/1997 | Wang et al. |
| 5,715,526 A | * | 2/1998 | Weaver et al. ............... 455/126 |
| 5,794,129 A | | 8/1998 | Komatsu ..................... 455/69 |
| 5,930,242 A | * | 7/1999 | Mimura ....................... 370/331 |
| 6,118,983 A | | 9/2000 | Egusa et al. |
| 6,272,125 B1 | | 8/2001 | Nomura |
| 6,393,005 B1 | | 5/2002 | Mimura |

FOREIGN PATENT DOCUMENTS

| | | |
|---|---|---|
| CN | 1208519 | 2/1999 |
| EP | 0 751 630 | 1/1997 |
| EP | 0 751 630 A2 | 1/1997 |
| EP | 0 887 947 A2 | 12/1998 |
| JP | 64-89828 | 4/1989 |
| JP | 6-276140 | 9/1994 |

(Continued)

*Primary Examiner*—Temesghen Ghebretinsae
(74) *Attorney, Agent, or Firm*—Foley & Lardner LLP

(57) ABSTRACT

According to the invention, an input power to a transmission amplifier is controlled to prevent the amplifier from breakage and distortion of wave form. All of spread transmission data are additively combined with each other in an additive composite section 11 to obtain an amplitude data S2 and a transmission mean value information S8 at its optional time mean. The amplitude data S2 is modulated in a modulation section 13 to be converted into a modulation output signal S4 which is input in an amplification section 15 and a signal transmission power amplifier 30 through a variable ATT section 14, whereby its power is amplified. A mean transmission power data S11 which is an optional time mean of transmission power data S7 from a wave detection section 17 is calculated in a comparison/control section 19, and the mean value information of transmission S8 and a maximum transmission power value S9 are compared with each other to produce the attenuation amount control signal S10 of the variable ATT section 14. In case that S8 is not more than S9, a differential correction value of S11 and S8 is S10, and in case that S8 is less than S9, a differential correction value of S11 and S9 is S10.

4 Claims, 7 Drawing Sheets

FOREIGN PATENT DOCUMENTS

| | | |
|---|---|---|
| JP | 9-36801 | 2/1997 |
| JP | 10-51379 | 2/1998 |
| JP | 11-27233 | 1/1999 |
| JP | 11-74804 | 3/1999 |
| JP | 11-74834 | 3/1999 |
| JP | 11-331908 | 11/1999 |
| WO | WO97/09794 | 3/1997 |
| WO | WO97/09794 A1 | 3/1997 |

* cited by examiner

BASE STATION TRANSMITTER AND CDMA MOBILE COMMUNICATION SYSTEM COMPRISING THE SAME

FIELD OF THE INVENTION

The present invention relates to a signal transmission device of base station and a CDMA movable communication system using the same, and more particularly, relates to a signal transmission device of base station in which spread signal transmission data of all transmission channels are additively combined with each other to produce a quantized amplitude data, to make it to be a modulation output signal of wireless carrier wave frequency by digital to analog conversion, to input it to a transmission amplification means through a variable attenuation means in which an attenuation amount is variable, and to transmit waves as a down-link transmitting output after power amplification, and a CDMA movable communication system using the same.

BACKGROUND OF THE INVENTION

In CDMA system, a signal is transmitted by implementing a spread modulation using a spread signal of a high transmitting speed after normal information modulation. In a receiving side, the received signal is subjected to a spread demodulation using spread signal same as that in the transmitting side to return it to the original information band width and then is subjected to normal information demodulation. A mutually orthogonal spread sign series is allotted to each user, and a plurality of movable stations own same frequency band width. Thus, a signal desired by a movable station may be an interfered signal to the other movable stations.

For example, when a communication between a base station X and a movable station A is implemented with a communication between the base station and another movable station B simultaneously, the station A receives a signal transmitted thereto as a desired wave signal SA and also receives a signal transmitted to the station B as an interfered signal SB. The received signals SA and SB are same in fluctuation characteristic, and a ratio of the received electric power of the desired wave signal to that of the interfered wave signal is constant regardless of position of the movable station, because they are received from the base station X through the same transmitting path to the movable station A.

However, when the movable station A receives the desired wave signal from the base station X and receives the interfered wave signal from other base station Y, the signal component transmitted from the base station X reaches the movable station A through a transmitting path different from the signal component transmitted from the base station Y. As a result, since the fluctuation characteristic of the signal components is different from each other, the movable station A which is located around the boarder of cell is much affected by the interfered wave signal transmitted from the other base station Y.

In the case, deterioration of communication quality in the movable station which is located around the boarder of cell can be prevented by increasing a transmitting electric power of the base station more than a standard electric power. Also, deterioration of communication quality in the movable station which is located in a place receiving a plurality of strong multi-pass signal can be prevented by increasing a transmitting electric power of the base station more than a standard electric power.

On one hand, it is necessary in other movable station of good communication quality that a transmitting electric power of the base station is less than a standard electric power in order to reduce the interfered wave electric power which is received by the other movable station communicating with the base station.

From the above reasons, a down-link (transmission from the base station to the movable station) transmission power control is required to obtain uniform communication quality within a service area.

On the other hand, a dynamic range of transmission power amplifier in the base station is limited, and where overpower is input, an output spectrum may be distorted and an amplifier may be broken. For the reason, the number of communication channels per one carrier is regulated and communication channels more than the number are not allotted.

However, where the down-link transmission power control as mentioned above is carried out, the limitation of communication channel to certain number becomes meaningless because the transmitting power of communication channel depends on its user. If the number of communication channels per one carrier is limited by considering the case where the transmission power in all communication channels becomes maximum as a result of the down-link transmission power control, the system of which a traffic volume is less can be achieved.

An object of the invention is to provide a signal transmission device of base station which is used for a movable communication system using a direct spread CDMA system.

Another object of the invention is to provide a movable communication system using a direct spread CDMA system, which prevents a transmission amplifier from breakage and prevents a transmission spectrum from distortion by input of overpower even during a down-link control of transmission power in a communication channel carried out by a transmission channel of base station, and which makes an area covered by the base station automatic expansion/reduction in accordance with total electric power of the communication channels.

DISCLOSURE OF THE INVENTION

The signal transmission device of base station of the invention, which is used for a movable communication system using a direct spread CDMA system, in which spread signal transmission data of all transmission channels are additively combined with each other to produce a quantized amplitude data, to change it to a modulation output signal of wireless carrier wave frequency by digital to analog conversion in accordance with a level of value of the amplitude data, to amplify a power of the modulation output signal by a transmission amplification means, and to transmit waves as a down-link transmitting output after power amplification, said device having a variable attenuation means capable of controlling a level attenuation amount of the modulation output signal in an input side of the transmission amplification means, the input of the transmission amplification means being controlled so that it is not over a limited value by comparing a value of the amplitude data with a predetermined maximum data to increase the level attenuation amount of the variable attenuation means in accordance with such degree that the value of the amplitude data is over the maximum data, whereby the breakage of the transmission amplifier and the distortion of the transmission spectrum which are caused by the input of overpower can be prevented even during the down-link control of transmission power.

As another aspect of the invention, the signal transmission device of base station of the invention used for base station of movable communication system using direct spread CDMA system, having a transmitter in which spread signal transmission data of all transmission channels are additively combined with each other to produce a quantized amplitude data and to change it to a modulation output signal of wireless carrier wave frequency by digital to analog conversion, and a transmission amplification means which amplifies a power of the modulation output signal to transmit waves as a transmission output to a movable station, said transmitter comprising an additive composite means to produce a quantized amplitude data; a modulation means which converts the amplitude data to an analog base band signal in accordance with a level of its value and implements a modulation to wireless carrier wave frequency to change it to a modulation output; a variable attenuation means capable of controlling an attenuation amount of the modulation output signal level in accordance with a value of control signal to be input; an amplification means which amplifies an electric power in order to output the modulation output signal, of which level is controlled by the variable attenuation means, as a transmitter output to the transmission power amplifier; a transmission power inspecting means inspecting the level of the transmitter output to the electric power amplification means and outputting a corresponding digital value as a transmission power data; a first mean value-calculating means calculating a mean value of the amplitude data per a predetermined time provided by the additive composite means and making it a transmission mean value which shows a mean value of the transmission power level to be required; a second mean value-calculating means calculating a mean value of the transmission power data per a predetermined time provided by the transmission power inspecting means and making it a transmission power mean value which shows a mean value of the actual transmission power; and a comparative control means comparing the transmission mean value provided by the first mean value-calculating means with a predetermined maximum transmission power value and, where the transmission mean value is not more than the maximum transmission power value, outputting a data for supplementing, as the control signal to the valuable attenuation means, a difference between the transmission mean value and the transmission power mean value provided by second mean value-calculating means, or where the transmission mean value is more than the maximum transmission power value, outputting a data for supplementing, as the control signal to the valuable attenuation means, a difference between the maximum transmission power value and the transmission power mean value.

A CDMA movable communication system of the invention comprises a plurality of base stations using the base transmission device, and movable stations moving between cells formed by the base stations and, while inspection of the cell for its movable station is carried out and control of the transmission power is carried out with the base station controlling the cell, carrying out communication processing, each of the base station reducing the cell size by reducing an electric power of pilot channel in accordance with an increasing amount of total electric power of connection channels transmitted to the movable station where the transmission mean value is more than the maximum transmission power value.

According to the transmission device for the base station of the invention which is used for the movable communication system using the direct spread CDMA system, the variable attenuator in the transmitter is controlled so that output of the transmitter is not over the predetermined maximum value, while the amplitude data after the transmission spread data of all transmission channels are additively combined with each other is monitored. Thus, the breakage of the transmission amplifier (transmission electric power amplifier) which is caused by the input of overpower and the distortion of the transmission spectrum can be prevented even during the down-link control of transmission power carried out by the transmission device of the base station. Further, according to the invention, when total electric power of the communication channels is elevated, electric power of pilot channel is automatically reduced, whereby a radius of the cell can be reduced. Thus, the movable station which is located around the boarder of the cell is handed off to other cell and therefore, the cell in which communication channels are tight can reduce the communication channels automatically.

PREFERRED EMBODIMENTS OF THE INVENTION

Figure 1:
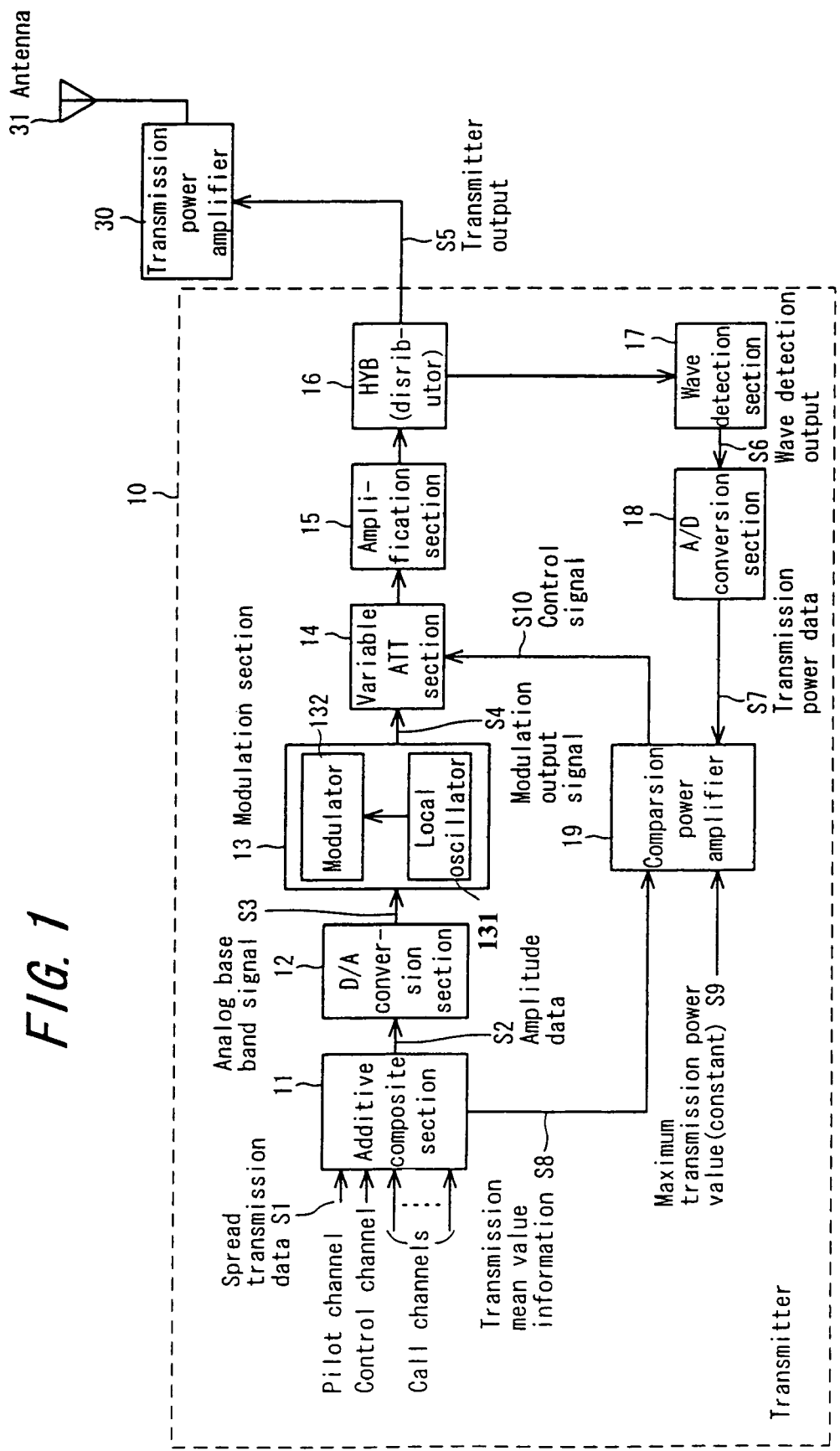
FIG. 1 is a block diagram showing an embodiment of a transmission device of base station in the invention.

The embodiments of the invention will be explained in more detail referring to the drawings.

FIG. 1 is a block diagram showing an embodiment of a transmission device of base station in the invention, which shows a basic construction. The transmission of base station in the invention shown in FIG. 1 is composed of a transmitter 10 for modulating a signal to be transmitted to output it as a wireless frequency signal (transmitter output S5), and a signal transmission power amplifier 30 for amplifying the output S5 of the transmitter 10 and for transmitting it as a wave from an antenna 31.

The transmitter 10 is composed of an additive composite section 11, a D/A conversion section 12, a modulation section 13, a variable ATT (attenuator) section 14, an amplification section 15, a HYB (distributor) 16, a wave detection section 17, an A/D conversion section 18, and a comparison/ control section 19. In the additive composite section 11, a spread transmission data S1 of a pilot channel, a control channel and a plurality of call channels are added to each other and are multiplexed to produce a quantized amplitude data S2. The data S2 is accumulated for an optional time (320 ms) to calculate the mean value which is the transmission mean value information S8 showing the average value of transmission power (transmitter output) level. In the D/A conversion section 12, the amplitude data S2 which is output from the additive composite section 11 is converted into an analog base band signal S3. In the modulation section 13 including a local oscillator 131 and a modulator 132, a modulation output signal S4 is output by a carrier wave which is formed by the analog base band signal S3 and the local oscillator 131. In the variable ATT (attenuator) section 14, a transmitter output level is controlled by controlling an attenuation amount of the modulation output signal S4 to be input based on a control signal S10. In the amplification section 15, the modulation output signal S4 of which power level is controlled in the variable ATT (attenuator) section 14 is amplified. In the HYB (distributor) 16, the output of the amplification section 15 is distributed to two outputs and one is output as the transmitter output S5 and the other is output to the wave detection section 17.

In the wave detection section 17, a wave detection output S6 which is voltage information is output by wave detection of the output of the HYB 16. In the A/D conversion section 18, the wave detection output S6 is quantized and converted to a signal transmission power data S7 (digital). In the comparison/control section 19, a transmission mean value information S8 to be output from the additive composite section 11 as first input, the signal transmission power data S7 to be output from the A/D conversion section 18 as second input and a maximum signal transmission power value S9 as third input which is a predetermined constant number of digital corresponding to maximum allowable level of the signal transmitter output S5 (i.e. output limitation of the signal transmission power amplifier 30) are input to produce a control signal S10 for controlling an attenuation amount of the variable ATT section 14.

In the comparison/control section 19, where a transmission mean value information S8 is not more than a maximum signal transmission power value S9, a mean value, which is obtained by accumulating the transmission power data S7 for optional constant time (in this case, 320 ms) and which is the mean transmission power value S11 showing a mean value of actual transmission power (transmitter output) level, is compared with the transmission mean value information S8 to output a data to supplement the difference and to produce a control signal S10 for controlling an attenuation amount of the variable ATT section 14, and where the transmission mean value information S8 is more than the maximum signal transmission power value S9, a data to supplement the difference between the mean value (the mean transmission power value S11) of the transmission power data S7 and the maximum signal transmission power value S9 is output to produce the control signal S10.

In the signal transmitter 10, the signal transmission mean value information S8 calculated in the additive composite section 11 and a mean value (mean signal transmission power data S11) of the signal transmission power data S7 obtained by quantization of the wave detection output S6 are compared with each other every constant time (320 ms), and the variable ATT section 14 is controlled by output of the data to supplement the difference of S8 and S11, whereby changes of advantages based on temperature change and time-passage change in the amplification section 15 are compensated.

The comparison of the transmission mean value information S8 and the mean signal transmission power data S11 is stopped when the transmission mean value information S8 is over the maximum signal transmission power value S9, and maximum signal transmission power value S9 and the mean signal transmission power data S11 are compared. The attenuation amount of the variable ATT section 14 is controlled by output of the data to supplement the difference of S9 and S11.

Thus, the breakage of transmission amplifiers (signal transmission power amplifier 30 and amplification section 15) and the distortion of transmission spectrum which are caused by overpower input can be prevented without exceeding the maximum value of the signal transmitter output 5. At the time, a pilot power is reduced by power increase of call channels to reduce a cell diameter, whereby the movable station (movable phone) which is located around the boarder of cell is handed off to other cells to reduce the call channels. As a result, the electric power of the call channels is reduced.

Figure 2:
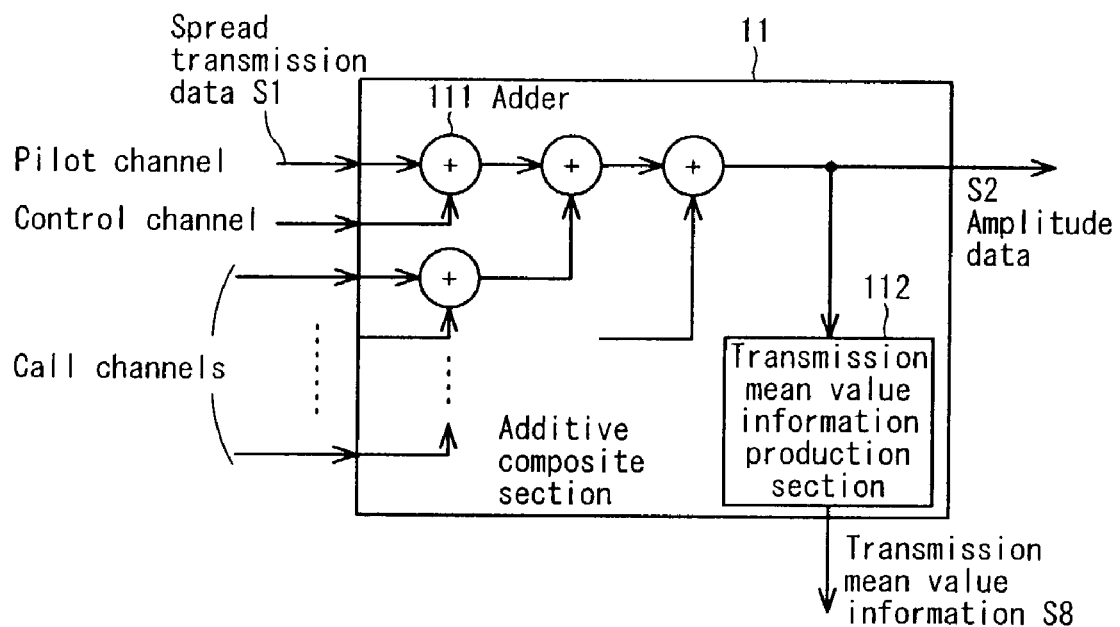
FIG. 2 is a block diagram showing a construction of additive composite section in FIG. 1.

Referring to FIG. 2, the additive composite section 11 will be explained in detail. In FIG. 2, the additive composite section 11 includes a plurality of adders 111 for inputting the spread transmission data S1 and outputting the amplitude data S2 obtained by adding all channels to be input, and a production section 112 of the transmission mean value information for accumulating the amplitude data S2 to be input every constant time and calculating and outputting the transmission mean value information S8.

Figure 3:
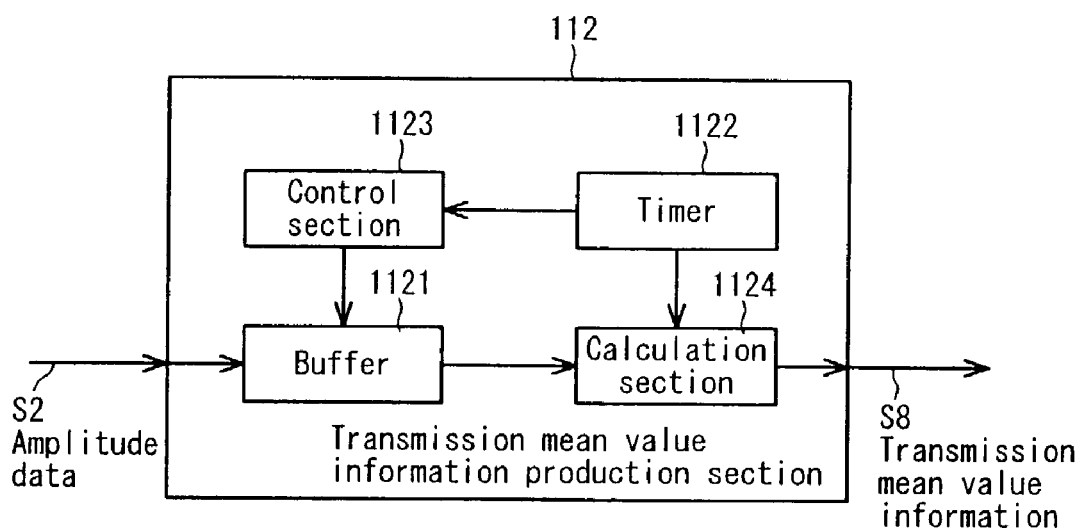
FIG. 3 is a block diagram showing a construction of a transmission mean value information-production section in FIG. 2.

Referring to FIG. 3, the production section 112 of the transmission mean value information will be explained in detail. In FIG. 3, the production section 112 of the transmission mean value information includes a buffer 1121 for accumulating the amplitude data S2, a timer 1122 for measuring the optional constant time (320 ms) to be set in advance, a control section 1123 for carrying out a timing control of the buffer 1121 associated with the timer 1122, and a calculation section 1124 for accumulating the amplitude data S2 within the constant time associated with the timer 1122 and for calculating the mean value of the amplitude data S2.

Figure 4:
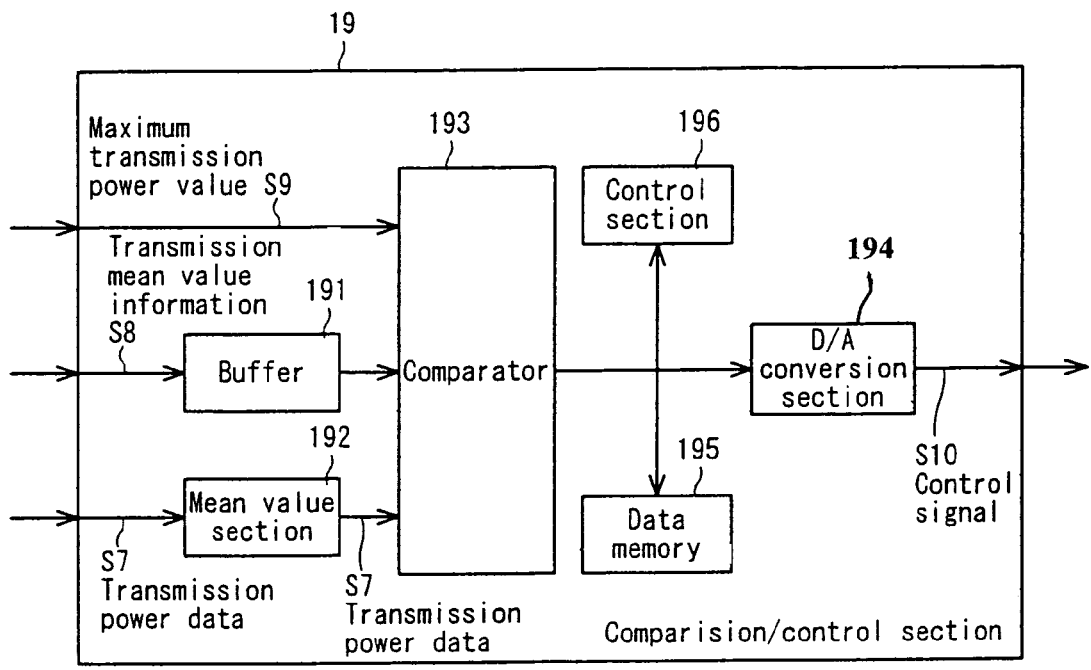
FIG. 4 is a block diagram showing a comparison/control section in FIG. 1.

Referring to FIG. 4, the comparison/control section 19 will be explained in detail. In FIG. 4, the comparison/control section 19 includes a buffer 191 for accumulating the transmission mean value information S8 to be input, a mean value section 192 for accumulating the transmission power data S7 to be input with the transmission mean value information S8 within an optional constant time and for calculating the mean value (mean transmission power data S11), a comparator 193 for comparing the transmission mean value information S8 with the transmission power data S7, which are accumulated in the buffer 191 and the mean value section 192 and are synchronized in timing, or for comparing the maximum transmission power value S9 with the transmission mean value information S8, a D/A conversion section 194 for converting an output from the comparator 193 to analogous control signal S10 and for outputting it, a data memory 195 for storing the amplitude data corresponding to the output from the comparator 193 and provided in the D/A conversion section 194, and a control section 196 for controlling a flow of the data. The maximum transmission power value S9 is such designated value that is set in a memory means (not shown), in advance.

Figure 5:
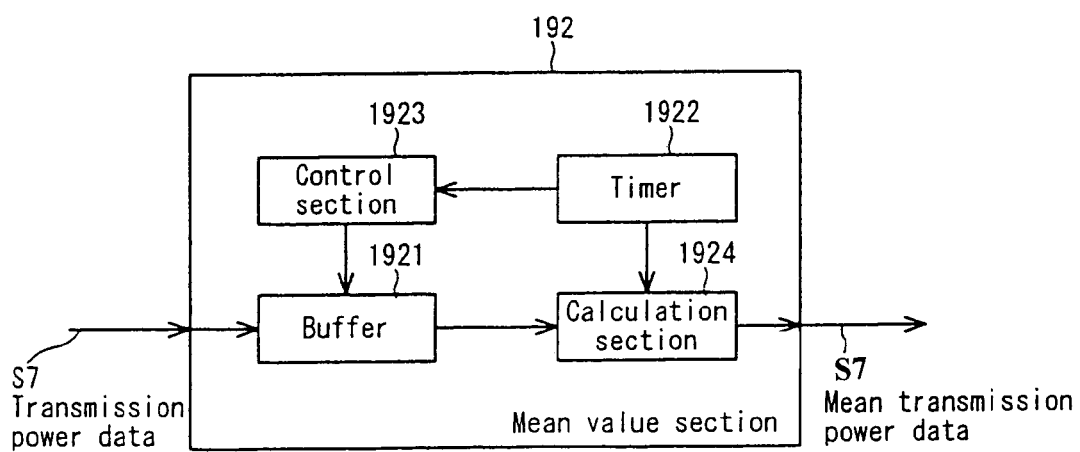
FIG. 5 is a block diagram showing a construction of mean value section in FIG. 4.

Referring to FIG. 5, the mean value section 192 will be explained in detail. In FIG. 5, the mean value section 192 includes a buffer 1921 for accumulating the transmission power data S7, a timer 1922 for measuring the optional constant time (320 ms) to be set, a control section 1923 for controlling the timing of the buffer 1921 associated with the timer 1922, and a calculation section 1924 for accumulating the transmission power data S7 within the optional constant time associated with the timer 1922 and for calculating the mean value of the transmission power to output the mean transmission power data S11.

Referring to FIGS. 1 to 5, movements of the invention will be explained.

The spread transmission data S1 of each transmission channel is added to each other in the additive composite section 11 of the transmitter 10 to provide the amplitude data S2 containing the amplitude information of all transmission channels. The amplitude data S2 is output as the transmission mean value information S8 by calculating, in the transmission mean value information production section 112 of the additive composite section 11, the mean power value per optional constant time (in this example, 320 ms), which is mean value of transmission power level required as transmitter output in accordance with value of the amplitude data.

That is, in the transmission mean value information production section 112, the transmission mean value information S8 can be obtained by introducing the amplitude data S2 into the buffer 1121 only for the optional constant time and integrating it in the calculating section 1124. The transmission mean value information S8 is used in the comparison/control section 19 as explained hereinafter.

The amplitude data S2 which is output from the additive composite section 11 becomes the analog base band signal S3 corresponding to the value of the amplitude data by digital-analog conversion in the D/A conversion section 12. The analog base band signal S3 is mixed in the modulator 132 of the modulation section 13 with a local signal produced in the local oscillator 131 of the modulation section 13 and is output as the modulation output signal S4.

The modulation output signal S4 is input in the variable ATT section 14 in which attenuation amount is variable by the control signal S10, and is input to the amplification section 15 after the level control (attenuation control). In the amplification section 15, a power amplification is carried out to output the level-controlled modulation output signal S4 to the transmission power amplifier 30 as transmitter power.

The modulation output signal S4 of which power is amplified in the amplification section 15 is divided into the transmitter power S5 and the output for the wave detection section 17 in the HYB 16.

In the wave detection section 17, the input signal is detected by a means such as envelope detection to output the wave detection output S6. The wave detection output S6 is input in the A/D conversion section 18 and the transmission data S7 is output as digital data. That is, the transmission data S7 is digital value corresponding to a power level of actual transmitter output.

In the comparison/control section 19, the transmission power data S7, the transmission mean value information S8 and the maximum transmission power value S9 are input. The mean transmission power data S11 which is a mean value of optional constant time is obtained from the transmission power data S7. The maximum transmission power value S9 is a fixed value setting an input limitation value of the transmission power amplifier 30. The movement in case where the transmission mean value information S8 is not more than the maximum transmission power value S9 is different from the movement in case where the transmission mean value information S8 is more than the maximum transmission power value S9.

In the former case that the transmission mean value information S8 is not more than the maximum transmission power value S9, as shown in prior art (e.g. Japanese Patent No. 2,856,250), the difference ($\Delta p$) of the transmission mean value information S8 and the mean transmission power data S11 is detected and the control signal S10 for controlling the attenuation amount of the variable ATT section 14 so that $\Delta p$ may be minimum is output as the movement for compensating the change based on temperature or passage of time in the amplification section 15.

In the latter case that the transmission mean value information S8 is more than the maximum transmission power value S9, as the movement of the invention, the difference ($\Delta m$) of the mean transmission power data S11 and the maximum transmission power value S9 is detected and the control signal S10 for controlling the attenuation amount of the variable ATT section 14 so that $\Delta m$ may be minimum is output.

Figure 6:
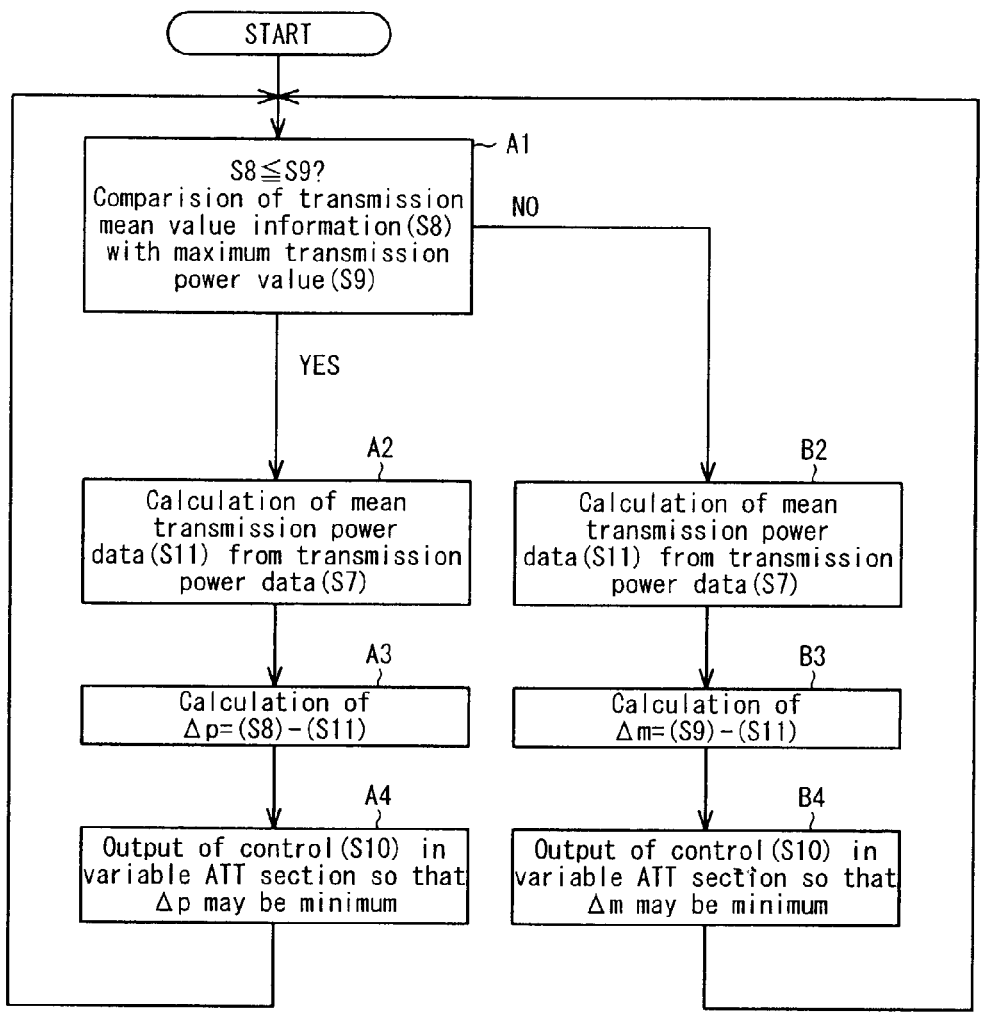
FIG. 6 is a flow chart of the comparison/control section in FIG. 1.

Referring to FIG. 6, concrete movement in the comparison/control section 19 will be explained. In the comparison/control section 19, the transmission mean value information S8 and the maximum transmission power value S9 which are input are compared with each other (Step A1). Where the transmission mean value information S8 is not more than the maximum transmission power value S9, the transmission power data S7 to be input is accumulated to obtain the mean value, and the mean transmission power data S11 is calculated (Step A2). Then, the difference ($\Delta p$) of the transmission mean value information S8 and the mean transmission power data S11 is calculated (Step A3). The change based on temperature or passage of time in the amplification section 15 is compensated by controlling the attenuation amount of the variable ATT section 14 so that $\Delta p$ may be minimum (Step A4).

On the other hand, where the transmission mean value information S8 is more than the maximum transmission power value S9, that is, where the transmission mean value information S8 is over the input limitation of the transmission power amplifier 30, the mean transmission power data S11 is calculated from the transmission power data S7 to be input in the same manner as Step A2 (Step B2). The difference ($\Delta m$) of the mean transmission power data S11 and the maximum transmission power value S9 is calculated (Step B3) and the attenuation amount of the variable ATT section 14 is controlled so that $\Delta m$ may be minimum (Step B4).

Thus, even if the transmission mean value information S8 is more than the maximum transmission power value S9, the power to be input in the amplification section 15 is controlled to a constant value. That is, the transmitter output is always not over the maximum transmission power value S9 and an overpower input to the transmission power amplifier 30 can be prevented. Therefore, the breakage of the amplifier based on the overpower input in the transmission power amplifier 30 and the distortion of the transmission wave form in the transmission power amplifier 30 can be prevented.

Figure 7:
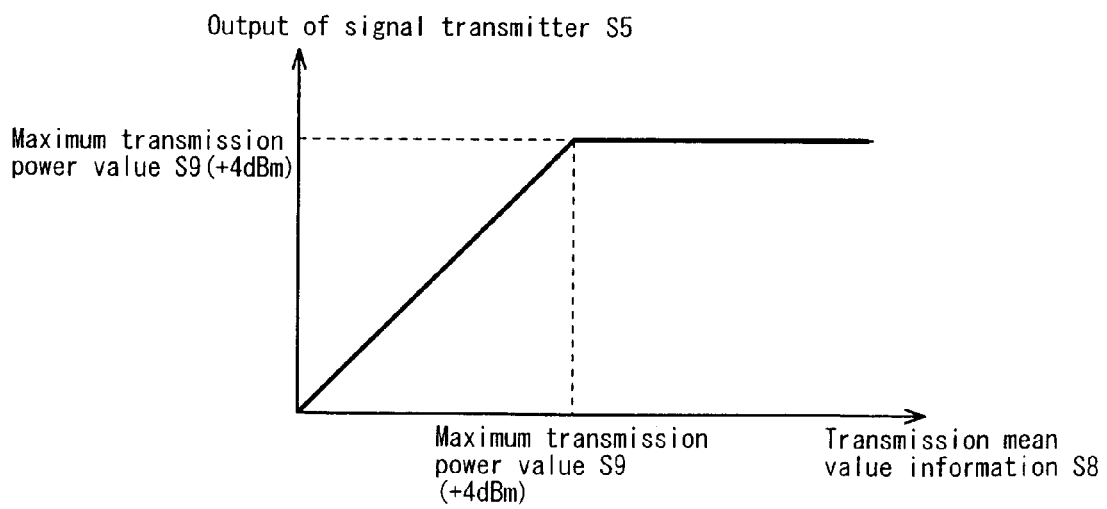
FIG. 7 is a drawing showing a relationship between the transmission mean value information and a transmitter power.

In FIG. 7, a relationship of the transmission mean value information S8 and the transmitter output S5 is shown. Where the transmission mean value information S8 is not more than the maximum transmission power value S9, the transmitter output S5 is more, as the transmission mean value information S8 is more. Where the transmission mean value information S8 is more than the maximum transmission power value S9, the transmitter output S5 is constant, even if the transmission mean value information S8 is increased.

The movement of the invention will be explained using concrete numerical values. In FIG. 7 showing a relationship of electric power in the transmission mean value information S8 and the transmitter output S5, the maximum transmission power value S9 is set to +4 dBm. Where the transmission mean value information S8 is +1 dBm, the maximum transmission power value S9, the transmitter output S5 is output as +1 dBm, because the transmission mean value information S8 is not more than the maximum transmission power value S9. Even if the transmitter output S5 becomes +0.5 dBm tentatively by temperature change in the amplification section 15, the attenuation amount in the variable ATT section 14 is reduced by 0.5 dBm based on the control signal S10 to be output from the comparison/control section 19 and the transmitter output signal S5 is maintained to +1 dBm. In case that the transmission mean value information S8 is +5 dBm by calculation, the attenuation amount in the variable ATT section 14 is increased by +1.0 dBm based on the control signal S10 to be output from the comparison/control section 19 because the transmission mean value information S8 is more than the maximum transmission power value S9, and the transmitter output signal S5 is rounded to +4 dBm.

Next, referring to FIG. 8, the cell change will be explained where the transmission mean value information S8 is more than the maximum transmission power value S9, that is, where functions of the invention are carried out.

Figure 8:
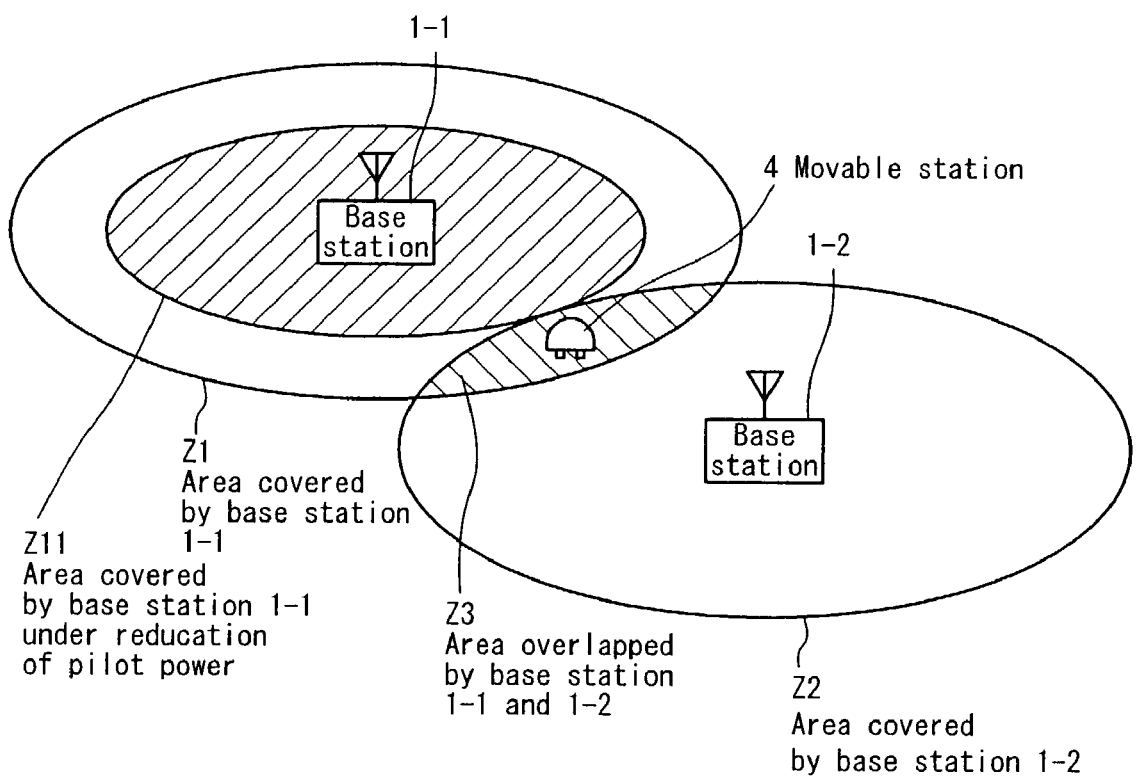
FIG. 8 is a drawing for illustrating an area size change of cells in accordance with the transmission power provided by base station.

In FIG. 8, areas which are covered by two adjacent base stations 1-1, 1-2 are named area Z1 and area Z2, respectively. A movable station 4 is located in area Z-3 where area Z1 and area Z2 overlap each other. The movable station 4 communicates with the base station 1-1 and the base station 1-2.

For example, if the transmission mean value information S8 is more than the maximum transmission power value S9 in the base station 1-1, the transmission power is rounded to the maximum transmission power and the pilot power is reduced. As a result, area which is covered by the base station 1-1 is changed from the area Z1 to area 11 smaller than the area Z1. Accordingly, the area in which the movable station 4 exists becomes only the base station 1-2 (i.e. area Z2) and the movable station stops to communicate with the base station 1-1 and communicates with only the base station 1-2.

In this example, one communication channel in the base station 1-1 is reduced and the transmission mean value information S8 is reduced. If the transmission mean value information S8 is not more than the maximum transmission power value S9, area which is covered by the base station 1-1 is expanded. According to the invention, areas which are covered by the base stations can be automatically increased or decreased.

A second embodiment of the invention will be explained referring to the drawings.

Figure 9:
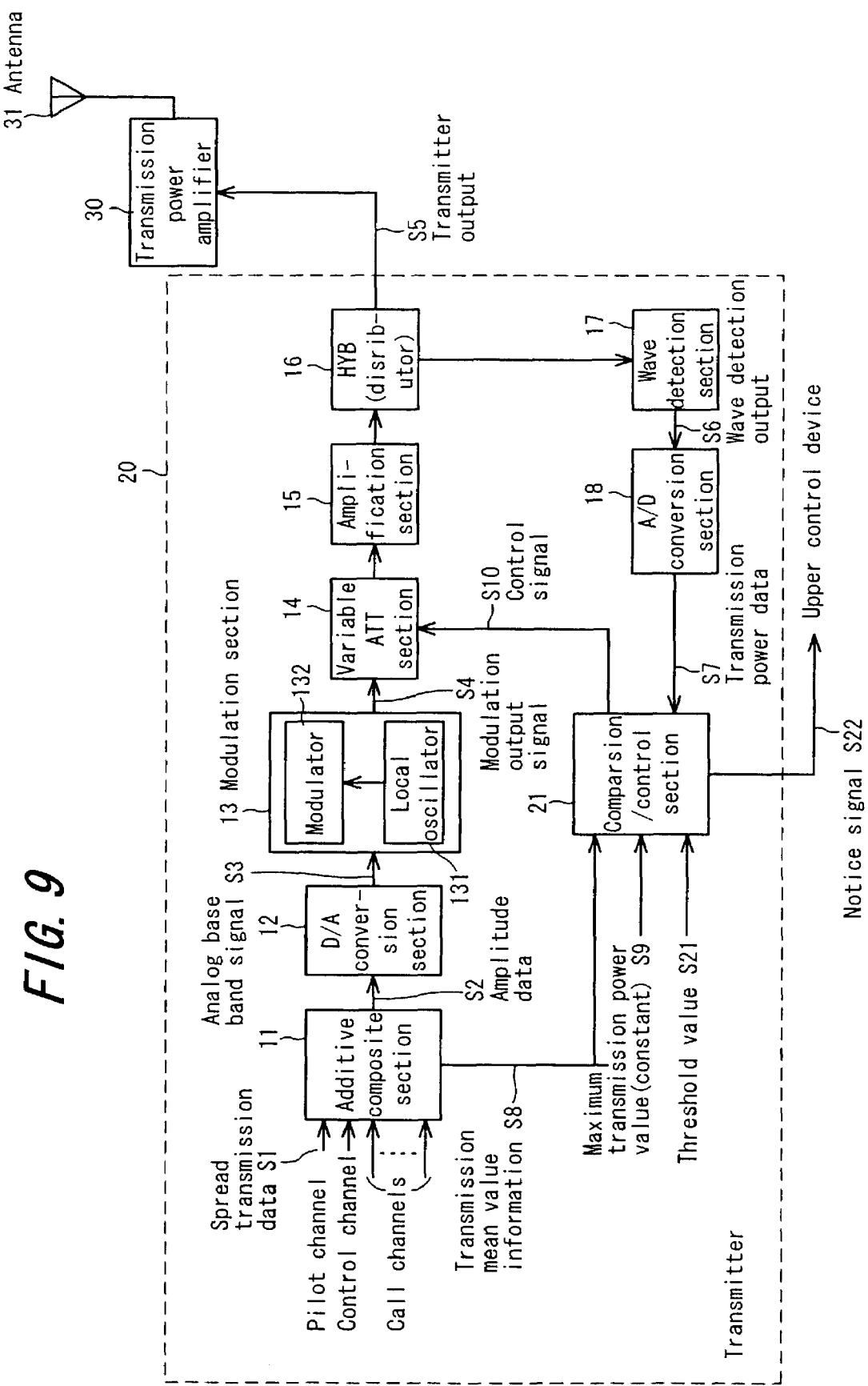
FIG. 9 is a block diagram showing another embodiment of a transmission device of base station in the invention.

FIG. 9 is a block diagram showing second embodiment of a transmission device of base station in the invention. In FIG. 9, the transmission device of base station is same as the transmission device (first embodiment) shown in FIG. 1 except that the comparison/control section 19 (transmitter 10) is replaced by the comparison/control section 21 (transmitter 20).

In the comparison/control section 21, the transmission mean value information S8 which is output from the additive composite section 11 every optional constant time (320 ms) is input and the transmission power data S7 which is output from the A/D conversion section 18 is input. Where the transmission mean value information S8 is not more than the maximum transmission power value S9 (constant number), the transmission power data S7 to be input is accumulated every optional constant time (320 ms) and is averaged to obtain the mean transmission power data S11. Then, the difference of the transmission mean value information S8 and the mean transmission power data S11 is calculated. The data to supplement the difference is output and the control signal S10 for controlling the variable ATT section 14 is produced.

Where the transmission mean value information S8 is more than the maximum transmission power value S9, the data to supplement the difference of the mean transmission power data S11 and the maximum transmission power value S9 is output and the control signal S10 for controlling the variable ATT section 106 is produced.

Further, where the transmission mean value information S8 is more than the threshold value S21 which is more value than the maximum transmission power value S9, the notice signal S22 is output in order to notice the fact to upper control device (upper control station) which is not shown. The threshold value S21 is a designated value which is set in the memory means (not shown), in advance, as well as the maximum transmission power value S9.

The upper control device (upper control station) which receives the notice signal S22 prevents the elevation of total electric power in the call channels by rejecting increase of the number of the call channels and increase of the electric power in the power control. In the first embodiment of the invention, if the elevation of the total electric power continues, the cell radius is reduced to make some zone in which communication becomes impossible. In the second embodiment of the invention, the above problem can be solved because it is possible to control the reduction of the cell radius within the certain range.

Figure 10:
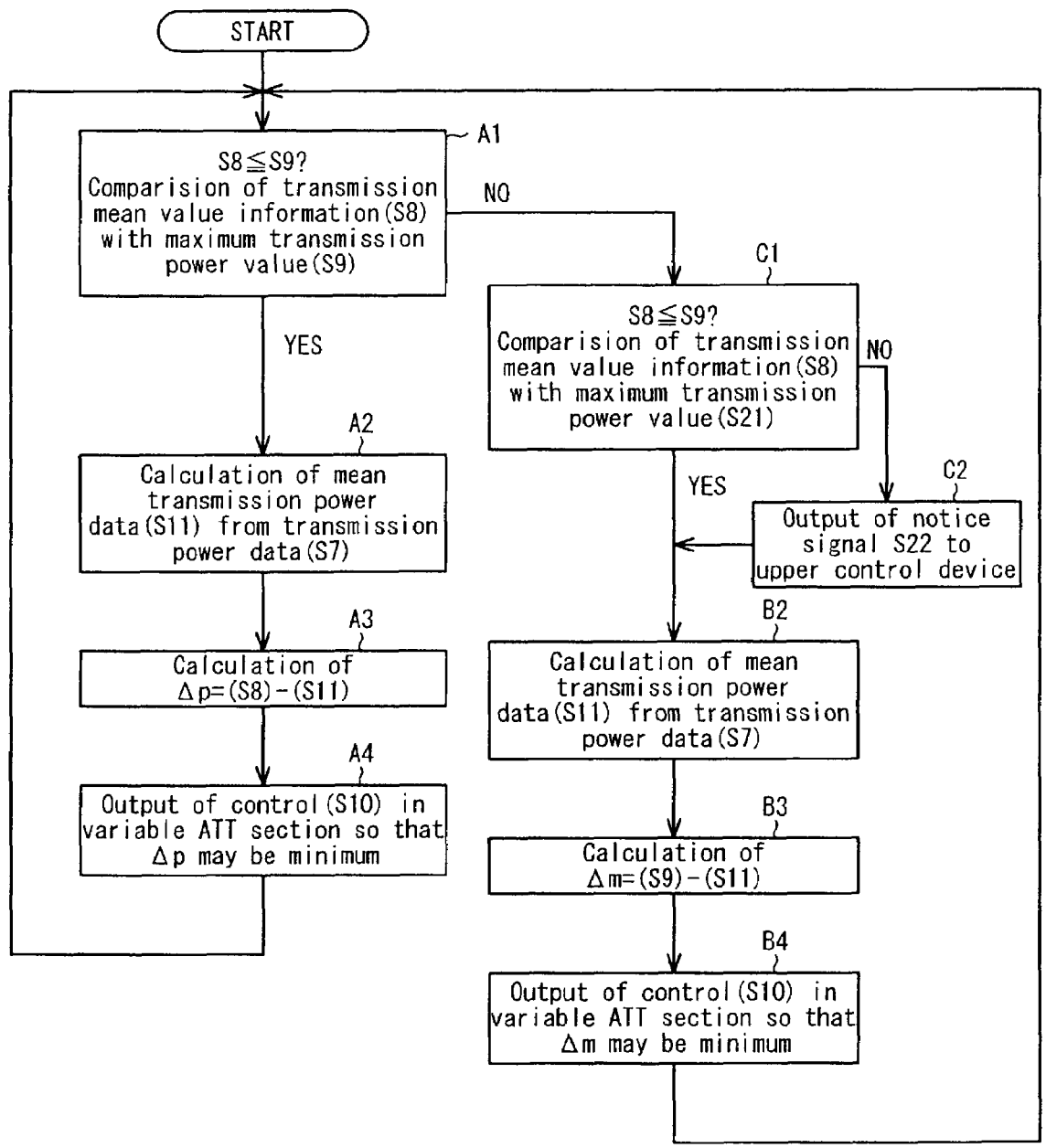
FIG. 10 is a flow chart of the comparison/control section in FIG. 9.

The movement flow of the comparison/control section 21 in the second embodiment of the invention will be explained referring to FIG. 10 which is same as the movement flow in comparison/control section 19 in FIG. 6 except that the Steps C1 and C2 are added.

In the processing of Step A1, the transmission mean value information S8 is compared with the maximum transmission power value S9. Where the transmission mean value information S8 to be input is more than the maximum transmission power value S9 and the transmission mean value information S8 is more than the threshold value S21, the notice signal S22 is output to the upper control device (upper control station). The upper control device controls the number control processing and power control processing for the constant time after receipt of the notice signal S22 (mean value calculation period of the transmission mean value information S8 and the mean transmission power data S11: 320 ms) so that the total electric power of the down-link call channel in the base station is not increased.

ADVANTAGES IN INDUSTRY

According to the invention, when the transmission power is close to the limitation of the transmission amplitude means by the increase of the number of the call channels or by the increase of the call channel power depending on the down-link transmission power control, the transmission power is maintained to the upper limit value by controlling the variable attenuation means in the transmission device, and the transmission amplitude means is protected. The transmission amplitude means is not requested the output more than its ability, whereby the distortion of the transmission wave form can be prevented.

Since the transmission power which is output from the transmission device is constant during the control of the transmission power in accordance with the invention, the pilot power is reduced and the cell radius is reduced, whenever the transmission power of the call channels is increased. Thus, the movable station (terminal) which is located around the boarder of the cell is handed off to other cell and therefore, the communication channel power of the cell is automatically reduced.

What is claimed is:

1. A signal transmission device of base station which is used for base station of movable communication system using direct spread CDMA system, having a transmitter in which spread signal transmission data of all transmission channels are additively combined with each other to produce a quantized amplitude data and to change it to a modulation output signal of wireless carrier wave frequency by digital to analog conversion, and a transmission amplification means which amplifies a power of the modulation output signal to transmit waves as a transmission output to a movable station, said transmitter comprising:

an additive composite means to produce a quantized amplitude data;

a modulation means which converts the amplitude data to an analog base band signal in accordance with a level of its value and implements a modulation to wireless carrier wave frequency to change it to a modulation output;

a variable attenuation means capable of controlling an attenuation amount of the modulation output signal level in accordance with a value of control signal to be input; an amplification means which amplifies an electric power in order to output the modulation output signal, of which level is controlled by the variable attenuation means, as a transmitter output to the transmission amplification means;

a transmission power inspecting means inspecting the level of the transmitter output to the transmission amplification means and outputting a corresponding digital value as a transmission power data;

a first mean value-calculating means calculating a mean value of the amplitude data per a predetermined time provided by the additive composite means and making it a transmission mean value which shows a mean value of the transmission power level to be required;

a second mean value-calculating means calculating a mean value of the transmission power data per a predetermined time provided by the transmission power inspecting means and making it a transmission power mean value which shows a mean value of the actual transmission power; and a comparative control means comparing the transmission mean value provided by the first mean value-calculating means with a predetermined maximum transmission power value and, where the transmission mean value is not more than the maximum transmission power value, outputting a data for supplementing, as the control signal to the variable attenuation means, a difference between the transmission mean value and the transmission power mean value provided by second mean value-calculating means, or where the transmission mean value is more than the maximum transmission power value, outputting a data for supplementing, as the control signal to the variable attenuation means, a difference between the maximum transmission power value and the transmission power mean value.

2. The signal transmission device of base station according to claim 1, wherein:

said comparative control means inputs a predetermined threshold value more than the maximum transmission power value therein, compares the transmission mean value with the maximum transmission power value, compares the transmission mean value with the threshold value where the transmission mean value is over the maximum transmission power value, and where the transmission mean value is over the threshold value, outputs such information signal to an upper control device.

3. A CDMA movable communication system comprising a plurality of base stations using the base transmission device of claim 1, and movable stations moving between cells formed by the base stations and, while inspection of the cell for its movable stations is carried out and control of the transmission power is carried out with the base station controlling the cell, each of the base station reducing the cell size by reducing an electric power of pilot channel in accordance with an increasing amount of total electric power of connection channels transmitted to the movable stations where the transmission mean value is more than the maximum transmission power value.

4. A CDMA movable communication system comprising a plurality of base stations using the base transmission device of claim 2, movable stations moving between cells formed by the base stations and, while inspection of the cell for its movable stations is carried out and control of the transmission power is carried out with the base station controlling the cell, an upper control station managing the base stations and the movable stations, said base station, where the transmission mean value is over the threshold value, outputting such information signal to the upper control station, and said upper control station managing the number control and the power control for a constant time after receipt of the notice signal so that total electric power of down-link call channels in the base station is not increased.

* * * * *